(12) United States Patent
Zhang et al.

(10) Patent No.: US 11,917,356 B2
(45) Date of Patent: Feb. 27, 2024

(54) APPARATUS AND METHOD FOR IDENTIFYING HEAD GESTURES

(71) Applicant: Robert Bosch GmbH, Stuttgart (DE)

(72) Inventors: Rui Zhang, Wannweil (DE); Hanna Beuchert, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/915,419

(22) PCT Filed: Jun. 21, 2021

(86) PCT No.: PCT/EP2021/066807
§ 371 (c)(1),
(2) Date: Sep. 28, 2022

(87) PCT Pub. No.: WO2022/028765
PCT Pub. Date: Feb. 10, 2022

(65) Prior Publication Data
US 2023/0135255 A1    May 4, 2023

(30) Foreign Application Priority Data

Aug. 6, 2020 (DE) ..................... 10 2020 209 939.1

(51) Int. Cl.
*H04R 1/10* (2006.01)
*G01P 13/00* (2006.01)
(Continued)

(52) U.S. Cl.
CPC ............ *H04R 1/1041* (2013.01); *G01P 13/00* (2013.01); *G01P 15/18* (2013.01); *G06F 3/017* (2013.01); *G06V 40/20* (2022.01)

(58) Field of Classification Search
CPC .......... G01P 15/18; G01P 13/00; G01P 15/02; G06F 3/017; H04R 1/10; G06V 40/20
See application file for complete search history.

(56) References Cited

U.S. PATENT DOCUMENTS

| 2006/0140422 A1 | 6/2006 | Zurek et al. |
| 2009/0097689 A1 | 4/2009 | Prest et al. |

(Continued)

FOREIGN PATENT DOCUMENTS

| CN | 107277661 A | 10/2017 |
| DE | 102018206979 A1 | 11/2019 |
| TW | M482914 U | 7/2014 |

OTHER PUBLICATIONS

International Search Report for PCT/EP2021/066807, dated Oct. 6, 2021.

(Continued)

*Primary Examiner* — Helen C Kwok
(74) *Attorney, Agent, or Firm* — NORTON ROSE FULBRIGHT US LLP; Gerard A. Messina

(57) ABSTRACT

A method for identifying head-shaking gestures and nodding gestures by using an accelerometer arrangement of a device that is worn on the head, the accelerometer arrangement providing acceleration signals for three linearly independent directions in space. The method includes the following steps: calculation of a norm of total acceleration with the aid of the acceleration signals provided by the accelerometer arrangement; and identification of head-shaking gestures and nodding gestures using the calculated norm of total acceleration; identification of a head-shaking gesture being performed as a function of a comparison between the calculated norm of total acceleration and a predetermined threshold value; and identification of a nodding gesture being performed as a function of identifying an oscillation of the calculated norm of total acceleration about a predetermined acceleration value.

10 Claims, 3 Drawing Sheets

(51) Int. Cl.
*G01P 15/18* (2013.01)
*G06F 3/01* (2006.01)
*G06V 40/20* (2022.01)

(56) References Cited

U.S. PATENT DOCUMENTS

| | | |
|---|---|---|
| 2012/0020502 A1 | 1/2012 | Adams |
| 2013/0316679 A1 | 11/2013 | Miller et al. |
| 2015/0003651 A1 | 1/2015 | Han et al. |
| 2015/0036835 A1 | 2/2015 | Chen |
| 2015/0109200 A1 | 4/2015 | Lee et al. |
| 2016/0283783 A1* | 9/2016 | Yang ............... G06V 40/23 |
| 2017/0258390 A1* | 9/2017 | Howard ............. A61B 5/369 |
| 2017/0334348 A1* | 11/2017 | Trinh ............... G06F 3/012 |
| 2018/0329505 A1* | 11/2018 | Takahashi .......... G06F 3/04883 |
| 2020/0060566 A1* | 2/2020 | Howard ............ A61B 5/7253 |
| 2020/0379573 A1* | 12/2020 | Takahashi .......... G06F 3/017 |

OTHER PUBLICATIONS

Hamalainen et al. "Jerk-Based Feature Extraction for Robust Activity Recognition From Acceleration Data," 2011 11th International Conference on Intelligent Systems Design and Applications, 2011, pp. 1-6. <https://www.semanticscholar.org/paper/Jerk-based-feature-extraction-for-robust-activity-H%C3%A4m%C3%A4l%C3%A4inen-J%C3%A4rvinen/4ed68218dbbb6dde08a23005e2b6d5befd0ce00f> Downloaded Sep. 28, 2022.

\* cited by examiner

APPARATUS AND METHOD FOR IDENTIFYING HEAD GESTURES

FIELD

The present invention relates to a method for identifying head gestures—that is to say head-shaking gestures and nodding gestures—and to an apparatus for a device that is worn on the head, in particular for earbuds, earphones, smart glasses or similar.

BACKGROUND INFORMATION

Earphones that have additional functionality are designated "hearables". The user can interact or communicate with the device by way of touch, gestures or voice control. For example, nods or shakes of the head may be identified in order to transmit a message of acceptance or decline to the device. With the aid of such gestures, the user can make adjustments and operate functions of bearable devices by simple head movements.

U.S. Patent Application Publication No. US 2009/097689 A, Taiwan Patent Application No. TWM 482914 U, and U.S. Patent Application Publication Nos. US 2013/316679 A, US 2015/003651 A and US 2015/036835 A describe approaches to combining the data from a plurality of sensors in order to track changes in the angle of the head in two or three dimensions—that is to say rotation about an x, y and z axis. The sensors may be accelerometers, rotation-rate sensors and pressure sensors.

Also available are approaches that evaluate only the measurement data of an individual sensor. U.S. Patent Application Publication No. US 2012/020502 A uses the data of a rotation-rate sensor, China Patent Application No. CN 107277661 A uses the data of a pressure sensor, and U.S. Patent Application Publication No. US 2006/140422 A uses the data of an accelerometer.

Inertial sensors such as accelerometers and rotation-rate sensors are significantly more sensitive to changes in movement and more robust in relation to environmental influences than other sensors such as pressure sensors, and for this reason they are best suited to analyzing movements.

A change in the orientation of the device in space—that is to say a change in the angle of rotation about the x, y and z axes—can be determined by the fusion of rotation-rate sensor and accelerometer data. The estimated orientation has a high level of accuracy over a brief period, which can be useful in identifying brief gestures. In particular, however, current consumption by the rotation-rate sensor is relatively high. The fusion of rotation-rate sensor and accelerometer data likewise contributes to a high current consumption.

If only rotation-rate sensor data are used, it is likewise possible to achieve high levels of accuracy in the identification of head gestures, since nods and shakes of the head correspond to changes in angle in different directions, which can be determined by integration of the rotation-rate signal. However, because of the use of the rotation-rate sensor, current consumption with this approach is likewise significantly higher than with methods based only on accelerometer data.

If the co-ordinate system of the device is set up to correspond to the head co-ordinate system, as for example in the case of smart glasses, a three-axis accelerometer is sufficient to determine the angle of tilt of the head. In this case, nods can be detected by way of changes in the angle of tilt. In the case of headphones, and in particular in the case of earbuds, however, the co-ordinate system of the device may differ pronouncedly from the head co-ordinate system, depending on the user and their habits, with the result that the angle of tilt of the device is not generally sufficient to identify nods. Furthermore, it is not possible to detect shakes of the head from the angle of tilt.

SUMMARY

The present invention provides a method for identifying head-shaking gestures and nodding gestures, and an apparatus for a device that is worn on the head.

Preferred embodiments for the present invention are disclosed herein.

According to a first aspect, the present invention accordingly relates to a method for identifying head-shaking gestures and nodding gestures by using an accelerometer arrangement of a device that is worn on the head, the accelerometer arrangement providing acceleration signals for three linearly independent directions in space. According to an example embodiment of the present invention, a norm of total acceleration is measured with the aid of the acceleration signals provided by the accelerometer arrangement. Head-shaking gestures and nodding gestures are identified using the calculated norm of total acceleration. A head-shaking gesture is identified as a function of a comparison between the calculated norm of total acceleration and a predetermined threshold value. A nodding gesture is identified as a function of identifying an oscillation of the calculated norm of total acceleration about a predetermined acceleration value.

According to a second aspect, the present invention accordingly relates to an apparatus for a device that is worn on the head, having an accelerometer arrangement and a signal-processing arrangement. According to an example embodiment of the present invention, the accelerometer arrangement provides acceleration signals for three linearly independent directions in space. The signal-processing arrangement calculates a norm of total acceleration with the aid of the acceleration signals provided by the accelerometer arrangement. The signal-processing arrangement identifies head-shaking gestures and nodding gestures using the calculated norm of total acceleration. The signal-processing arrangement carries out identification of a head-shaking gesture as a function of a comparison between the calculated norm of total acceleration and a predetermined threshold value. The signal-processing arrangement carries out identification of a nodding gesture as a function of identifying an oscillation of the calculated norm of total acceleration about a predetermined acceleration value.

The present invention provides a method for identifying head gestures which can be based only on the data of an accelerometer. According to an example embodiment of the present invention, the method is applicable both to devices that are worn in the ear (such as earbuds) or on the ear (such as headphones), and also to glasses. The method is robust in relation to the exact position at which the device is worn, and is impaired to only a negligible extent by the orientation of the sensor while the device is being worn. The method can achieve very high levels of accuracy of detection regardless of how the user wears the device. This results in a broad range of applications for different terminals, such as earbuds, headphones, glasses or similar.

The method is based only on accelerometer data, as a result of which the current consumption is significantly reduced by comparison with processes using rotation-rate sensors, and enables identification of both nodding and also shaking the head. The method is thus characterized by low consumption of current and resources.

The principle underlying the method is explained in more detail below. If the accelerometer arrangement is in a stationary condition, the value of the acceleration signal corresponds to the value of acceleration due to gravity, i.e., approximately 9.81 m/s².

The acceleration that the accelerometer arrangement undergoes in the event of a shake of the head in addition to movement of the head is in the horizontal plane—that is to say perpendicular to acceleration due to gravity. The value of the acceleration signal is in this case greater than that of acceleration due to gravity.

In the event of a nod, the acceleration generated by this movement of the head is in the same plane as acceleration due to gravity. Depending on whether the head is moved up or down, the direction of acceleration of the head movement is in agreement with the direction of acceleration due to gravity or is in opposition to it. The result is that the value of the acceleration that is measured by the accelerometer arrangement oscillates about acceleration due to gravity. The fact that the measured acceleration is greater than acceleration due to gravity in the case of shaking the head and oscillates about acceleration due to gravity in the case of nodding the head thus makes it possible to distinguish between shaking the head and nodding.

The designation "norm of total acceleration" should be understood as a mathematical norm. Preferably, the Euclidean norm or 2-norm may be used. However, it is also possible for further norms to be calculated, such as a 1-norm or a p-norm.

According to a further development of the method for identifying head-shaking gestures and nodding gestures according to the present invention, the head-shaking gesture or nodding gesture is identified only if a temporal change (such as a time derivative) in the acceleration signals (that is to say a jolt), which is calculated using the acceleration signals provided by the accelerometer arrangement, exceeds a predetermined threshold value. As a result, it is possible to distinguish head gestures from other movements by the user. The underlying consideration is that the changes in acceleration when shaking the head and nodding are greater than in ordinary use.

According to a further development of the method for identifying head-shaking gestures and nodding gestures according to the present invention, for the purpose of identifying whether the temporal change in the acceleration signals exceeds the predetermined threshold value, a norm of the temporal change in the acceleration signals is calculated with the aid of the acceleration signals provided by the accelerometer arrangement. The norm of the temporal change in the acceleration signals is filtered by way of a low-pass filter, the filtered norm of the temporal change in the acceleration signals being compared with the predetermined threshold value. Using the low-pass filter enables high-frequency sensor noise to be suppressed.

According to a further development of the method for identifying head-shaking gestures and nodding gestures according to the present invention, for the purpose of calculating the norm of the temporal change in acceleration signals, the values of the time derivatives of the acceleration signals are calculated and added together.

According to a further development of the method for identifying head-shaking gestures and nodding gestures according to the present invention, the calculated norm of total acceleration is filtered by way of a low-pass filter, head-shaking gestures and nodding gestures being identified with the aid of the filtered norm of total acceleration. Using the low-pass filter enables high-frequency sensor noise to be suppressed.

According to a further development of the method for identifying head-shaking gestures and nodding gestures according to the present invention, the calculated norm of total acceleration is filtered by way of a moving-average filter, head-shaking gestures and nodding gestures being identified with the aid of the filtered norm of total acceleration. Using the moving-average filter makes it possible to save on the resources required for calculation.

According to a further development of the method for identifying head-shaking gestures and nodding gestures according to the present invention, the calculated norm of total acceleration is filtered by way of a filter having a reduced scan rate, head-shaking gestures and nodding gestures being identified with the aid of the filtered norm of total acceleration. Using the filter having a reduced scan rate makes it possible to save on the resources required for calculation.

According to a further development of the method for identifying head-shaking gestures and nodding gestures according to the present invention, a head-shaking gesture is only identified if the norm of total acceleration exceeds the predetermined threshold value for at least a predetermined time span. This allows head-shaking gestures to be distinguished from other jolt-like events.

According to a further development of the method for identifying head-shaking gestures and nodding gestures according to the present invention, the predetermined acceleration value for identifying the nodding gesture corresponds to acceleration due to gravity.

Numbering of the method steps is for the sake of clarity, and in general is not intended to imply a particular time sequence. In particular, it is also possible for a plurality of method steps to be carried out at the same time.

DETAILED DESCRIPTION OF EXAMPLE EMBODIMENTS

Figure 1:
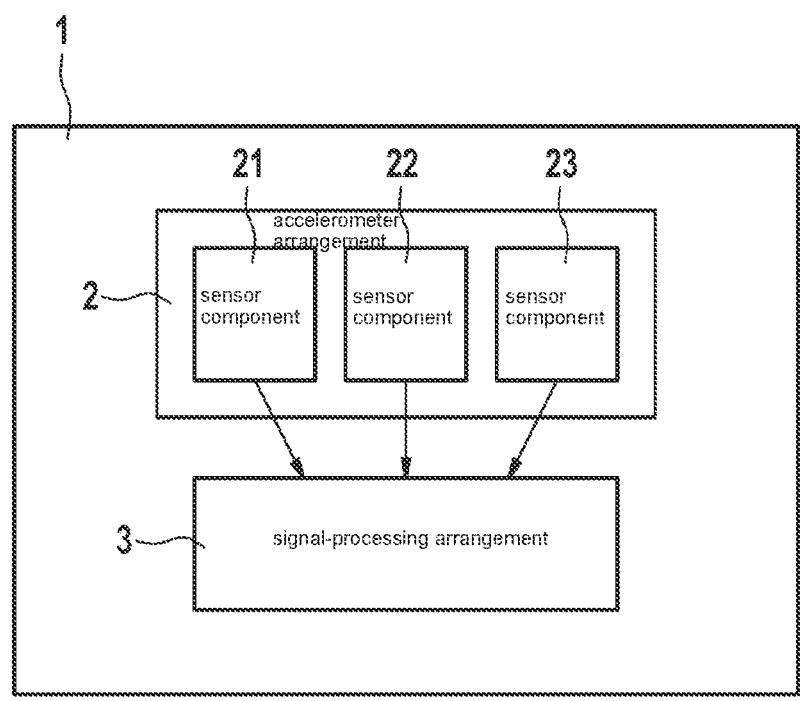
FIG. 1 shows a schematic block diagram of an apparatus for a device that is worn on the head, according to a specific embodiment of the present invention.

FIG. 1 shows a schematic block diagram of an apparatus 1 for a device that is worn on the head, in particular earbuds, earphones, smart glasses or similar. Apparatus 1 comprises an accelerometer arrangement 2 having three sensor components 21, 22, 23 which each detect acceleration in one direction in space, the directions in space being linearly independent. In particular, the directions in space may be perpendicular to one another.

The acceleration signals generated by sensor components 21, 22, 23 are output to a signal-processing arrangement 3 of apparatus 1 and processed by it. First of all, signal-processing arrangement 3 distinguishes between head gestures and other events. For this purpose, a temporal change (time derivative) in the acceleration signals is calculated. Further, a norm of the temporal change in the acceleration signals is calculated and is then optionally filtered by way of a low-pass filter. The filtered norm of the temporal change in the acceleration signals is compared with a predetermined threshold value. In the event that the threshold value is exceeded, a head gesture is identified.

In parallel or subsequently, signal-processing arrangement 3 checks whether there is a head-shaking gesture or a nodding gesture. For this purpose, signal-processing arrangement 3 calculates a norm of total acceleration with the aid of the acceleration signals provided by accelerometer arrangement 2. Optionally, the calculated norm is then filtered by way of a low-pass filter, a moving-average filter and/or a filter having a reduced scan rate. The calculated norm of total acceleration is compared with a predetermined threshold value. In the event that the threshold value is exceeded for a predetermined time span, signal-processing arrangement 3 identifies a head-shaking gesture.

If the threshold value is not exceeded, signal-processing arrangement 3 checks whether there is oscillation of the calculated norm of total acceleration about a predetermined acceleration value. For example, signal-processing arrangement 3 can check whether the predetermined acceleration value in a predetermined time window is exceeded or fallen below more often than a predetermined number. In the event that oscillation is identified, signal-processing arrangement 3 identifies a nodding gesture.

Figure 2:
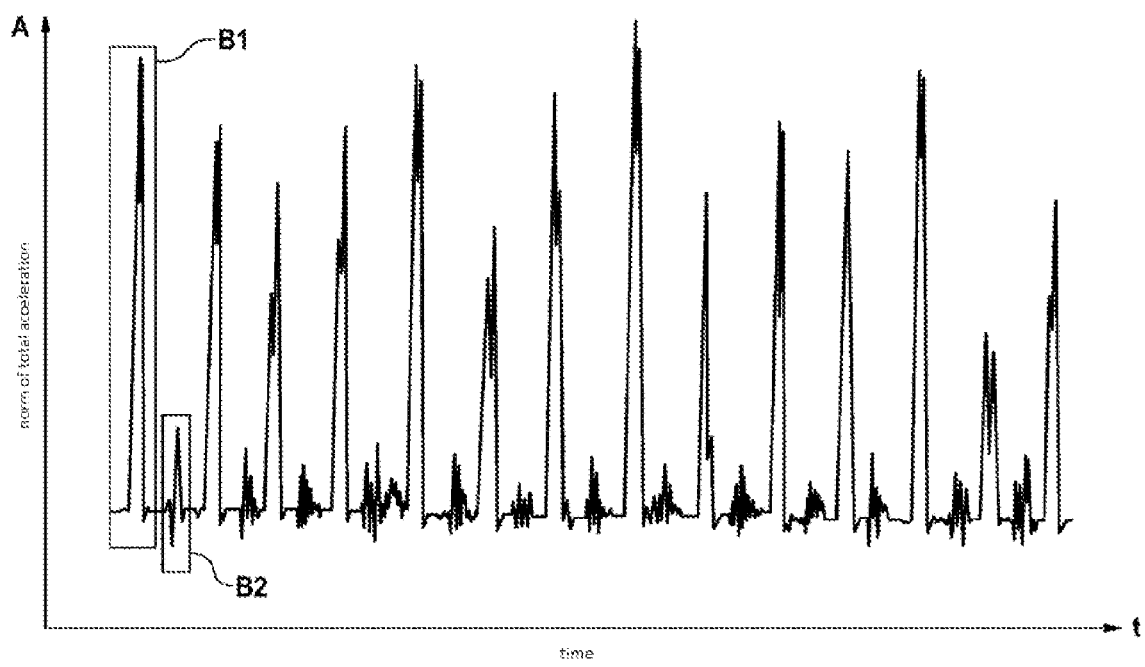
FIG. 2 shows a schematic illustration of the course over time of a norm of total acceleration.

FIG. 2 shows a schematic illustration of the course over time of a norm of total acceleration for alternately shaking the head and nodding. A first signal pattern B1 corresponds to a head-shaking gesture. Here, the value of the calculated norm A of total acceleration is large—that is to say that the predetermined threshold value is exceeded. A second signal pattern B2 corresponds to a nodding gesture. In this case, the calculated norm A of total acceleration oscillates about acceleration due to gravity g.

Figure 3:
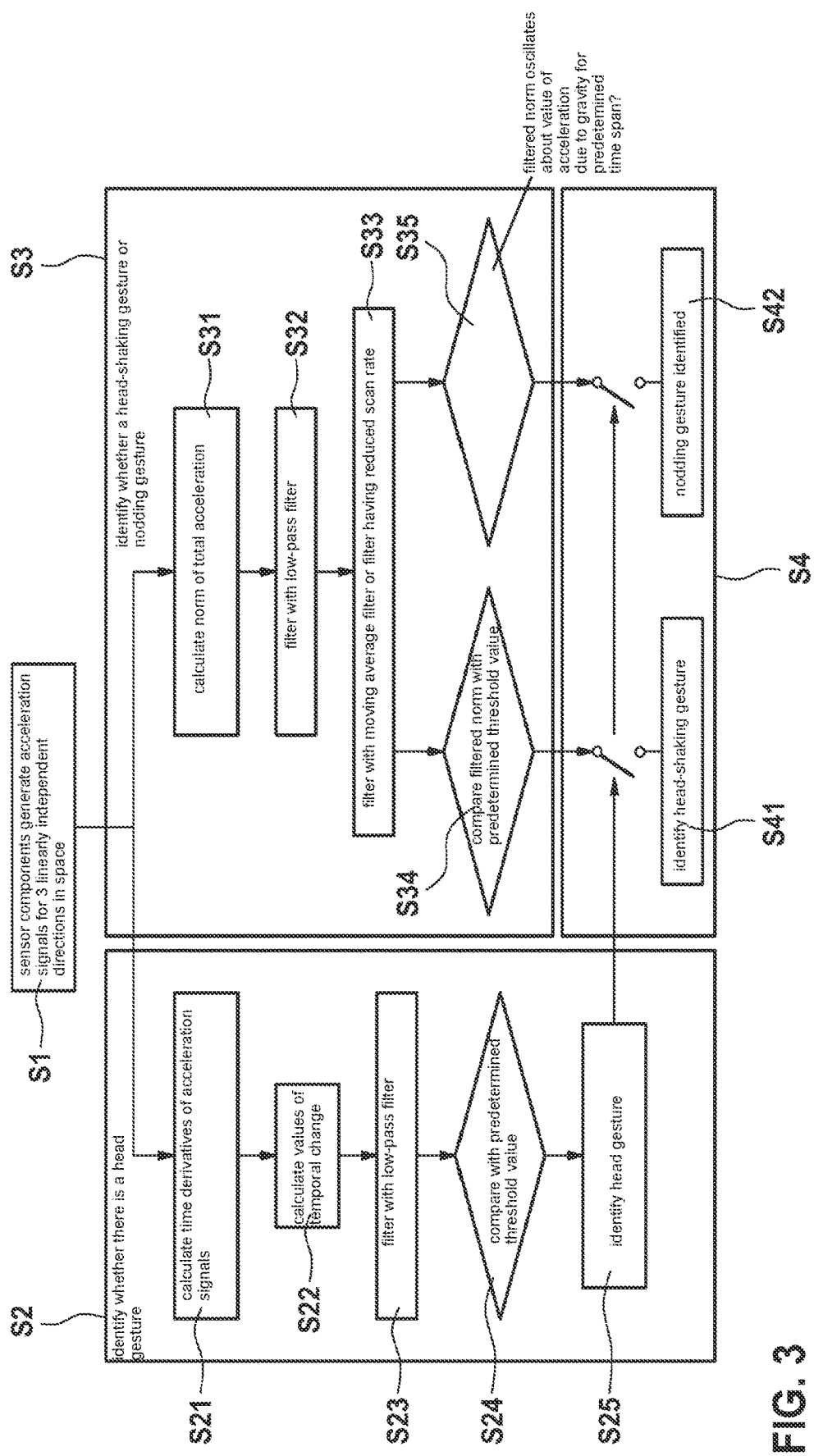
FIG. 3 shows a flow chart of a method for identifying head-shaking gestures and nodding gestures, according to a specific embodiment of the present invention.

FIG. 3 shows a flow chart of a method for identifying head-shaking gestures and nodding gestures.

In a first step S1, sensor components 21, 22, 23 of an accelerometer arrangement 2 of a device worn on the head generate acceleration signals for three linearly independent directions in space.

At least partly in parallel, or indeed successively in any desired sequence, it is identified whether there is a head gesture, S2, and, in the event that there is a head gesture, whether there is a head-shaking gesture or a nodding gesture, S3.

For the purpose of identifying whether there is a head gesture, S2, first of all time derivatives of the acceleration signals are calculated, S21. Further, a norm of the temporal change in the acceleration signals is calculated, such as an L1-norm, for which purpose the values of the temporal change in the individual acceleration signals are calculated separately and added together, S22.

The norm of the temporal change in the acceleration signals is filtered by way of a low-pass filter, S23, and the filtered norm of the temporal change in the acceleration signals is compared with a predetermined threshold value, S24. If the threshold value is exceeded, a head gesture is identified, S25. However, it is not yet established whether the gesture is a head-shaking gesture or a nodding gesture. This is determined in step S3, in which features are extracted with the aid of which the detected head gesture can be categorized as shaking the head or nodding.

For the purpose of identifying whether, in the event of there being a head gesture, there is a head-shaking gesture or a nodding gesture, S3, first of all a norm of total acceleration is calculated with the aid of the acceleration signals provided by accelerometer arrangement 2, S31. In the stationary condition, this corresponds to the value of acceleration due to gravity.

The calculated norm of total acceleration is filtered by way of a low-pass filter, S32. Further, the filtered norm of total acceleration is additionally filtered with the aid of a moving-average filter or a filter having a reduced scan rate, S33.

The filtered norm of total acceleration is compared with a predetermined threshold value. If this is exceeded for a predetermined time span, then a head-shaking gesture is identified, S34, in the event that there is a head gesture. If in step S25 it is identified that there is in fact a head gesture, then a head-shaking gesture is identified, S41.

If it is identified that the filtered norm of total acceleration oscillates about the value of acceleration due to gravity for a predetermined time span (step 35), then a nodding gesture is identified, in the event that there is a head gesture. If in step S25 it is identified that there is in fact a head gesture, then a nodding gesture is identified, S42.

What is claimed is:

1. A method for identifying head-shaking gestures and nodding gestures by using an accelerometer arrangement of a device that is worn on the head, the accelerometer arrangement providing acceleration signals for three linearly independent directions in space, the method comprising the following steps:
    calculating a norm of total acceleration using the acceleration signals provided by the accelerometer arrangement; and
    identifying a head-shaking gesture and a nodding gesture using the calculated norm of total acceleration;
    wherein identification of the head-shaking gesture is performed as a function of a comparison between the calculated norm of total acceleration and a predetermined threshold value, and identification of the nodding gesture being performed as a function of identifying an oscillation of the calculated norm of total acceleration about a predetermined acceleration value.

2. The method as recited in claim 1, wherein the head-shaking gesture or the nodding gesture is identified only if a temporal change in the acceleration signals, which is calculated using the acceleration signals provided by the accelerometer arrangement, exceeds a predetermined threshold value.

3. The method as recited in claim 2, wherein, for identifying whether the temporal change in the acceleration signals exceeds the predetermined threshold value, a norm of the temporal change in the acceleration signals is calculated using the acceleration signals provided by the accelerometer arrangement, wherein the norm of the temporal change in the acceleration signals is filtered by way of a low-pass filter, and wherein the filtered norm of the temporal change in the acceleration signals is compared with the predetermined threshold value.

4. The method as recited in claim 3, wherein, for calculating the norm of the temporal change in acceleration signals, values of time derivatives of the acceleration signals are calculated and added together.

5. The method as recited in claim 1, wherein the calculated norm of total acceleration is filtered using a low-pass filter, the head-shaking gesture and the nodding gesture being identified using the filtered norm of total acceleration.

6. The method as recited in claim 1, wherein the calculated norm of total acceleration is filtered using a moving-average filter, the head-shaking gesture and the nodding gesture being identified using the filtered norm of total acceleration.

7. The method as recited in claim 1, wherein the calculated norm of total acceleration is filtered using a filter having a reduced scan rate, the head-shaking gesture and the nodding gesture being identified using the filtered norm of total acceleration.

8. The method as recited in claim 1, wherein the head-shaking gesture is identified only when the norm of total acceleration exceeds the predetermined threshold value for at least a predetermined time span.

9. The method as recited in claim 1, wherein the predetermined acceleration value for identifying the nodding gesture corresponds to acceleration due to gravity.

10. An apparatus for a device that is worn on a head of a user, the apparatus comprising:

an accelerometer arrangement configured to provide acceleration signals for three linearly independent directions in space; and a signal-processing arrangement configured to:
  calculate a norm of total acceleration using the acceleration signals provided by the accelerometer arrangement, and
  identify a head-shaking gesture and a nodding gesture using the calculated norm of total acceleration,
wherein the signal-processing arrangement is configured to carry out identification of the head-shaking gesture as a function of a comparison between the calculated norm of total acceleration and a predetermined threshold value; and the signal-processing arrangement is configured to carry out identification of the nodding gesture as a function of identifying an oscillation of the calculated norm of total acceleration about a predetermined acceleration value.

* * * * *